United States Patent [19]

Haake

[11] 3,722,892

[45] *Mar. 27, 1973

[54] TAPE RECORDER WITH CASSETTE CHANGER

[75] Inventor: Robert Haake, Pasadena, Calif.

[73] Assignee: Bell & Howell Company, Chicago, Ill.

[ * ] Notice: The portion of the term of this patent subsequent to Sept. 7, 1988, has been disclaimed.

[22] Filed: June 29, 1970

[21] Appl. No.: 50,601

[52] U.S. Cl. ..............274/4 F, 274/4 E, 179/100.2 Z

[51] Int. Cl. .........................G11b 15/24, G11b 23/12

[58] Field of Search........274;4 F;4 E/; 242/180, 181, 242/197–200; 352/6–8, 123; 353/15, 19; 179/100.2 Z

[56] References Cited

UNITED STATES PATENTS 2,625,073 1/1953 Young....................................274/4 F
3,394,898 7/1968 Laa........................................274/4 E
3,417,938 12/1968 Markakis.............................274/4 E
3,484,055 12/1969 Raine...................................274/4 F
3,359,665 12/1967 Gerry...................................274/4 F

FOREIGN PATENTS OR APPLICATIONS 1,299,127 7/1969 Germany..............................274/4 F

*Primary Examiner*—Leonard Forman
*Assistant Examiner*—Dennis A. Dearing
*Attorney*—William F. Pinsak, John E. Peele, Jr., Kenneth W. Greb and William K. Serp

[57] ABSTRACT

A tape recorder-reproducer having a mechanism for loading any one of a plurality of cassettes from a magazine into a carrier means, for rotating the carrier means to invert the cassette to position each of two magnetic tracks on a tape in an effective position for recording or reproduction, for unloading the cassette from the carrier means into the magazine and for advancing the magazine to permit repeating the cycle.

17 Claims, 5 Drawing Figures

Inventor:
Robert Haake.

Kenneth ... Agent
By William ... Atty

Inventor:
Robert Haake

By Kenneth H. Jreb Agent
William A. Russell Atty

Inventor:
Robert Haake

Kenneth A. [illegible] Agent
By William F. [illegible] Atty

TAPE RECORDER WITH CASSETTE CHANGER

The present invention relates to tape recorder-reproducers or the like, and, more particularly, to a mechanism operable to sequentially place each of a plurality of cassettes into an effective position for recording or reproduction including inverting the cassette to position each of two magnetic tracks in the effective position.

A previously designed tape recorder-reproducer having a mechanism operable to sequentially place each of a plurality of cassettes into an effective position and operable to invert the cassette to position each of two magnetic tracks in the effective position is shown in a U.S. Pat. No. 3,603,597, issued Sept. 7, 1971, and assigned to the same assignee of this application.

Even though this previous design serves its intended purpose, it has a disadvantage in that it is capable of placing only the cassette located at the bottom of a stack of cassettes in an effective position. To place a specific cassette other than the bottom one in the effective position, the mechanism would have to operate through the loading, inverting and unloading cycle for each cassette until the specific cassette is located on the bottom, which although suitable for its intended purpose, is a less efficient and less desirable procedure than the present invention.

Another disadvantage of the above-identified previous design is that the stacking of several cassettes in a vertical orientation requires the product to be designed with a high profile resulting in an undesirable appearance relative to the present demands for low profile products.

It is an object of the present invention to provide an efficient low profile tape recorder-reproducer with a mechanism operable to selectively remove any one of a plurality of tape cassettes from a magazine and place the cassette in an effective position.

It is another object of the present invention to provide a tape recorder-reproducer with a mechanism operable to consecutively position each of two magnetic tracks of a tape supported in a tape cassette in an effective position.

It is a further object of the present invention to provide a tape recorder-reproducer with a mechanism operable to remove a cassette from a magazine and place it into a carrier means and then replace the cassette back into the magazine at one speed and operable to invert the cassette while in the carrier means at a reduced speed relative to the one speed.

It is another object of the present invention to provide a tape recorder-reproducer with a mechanism operable to index a magazine along a path to sequentially align cassettes with a loading and unloading mechanism.

Further and other objects of this invention will be readily understood by those skilled in the art with reference to the following description of the accompanying drawings.

Figure 1:
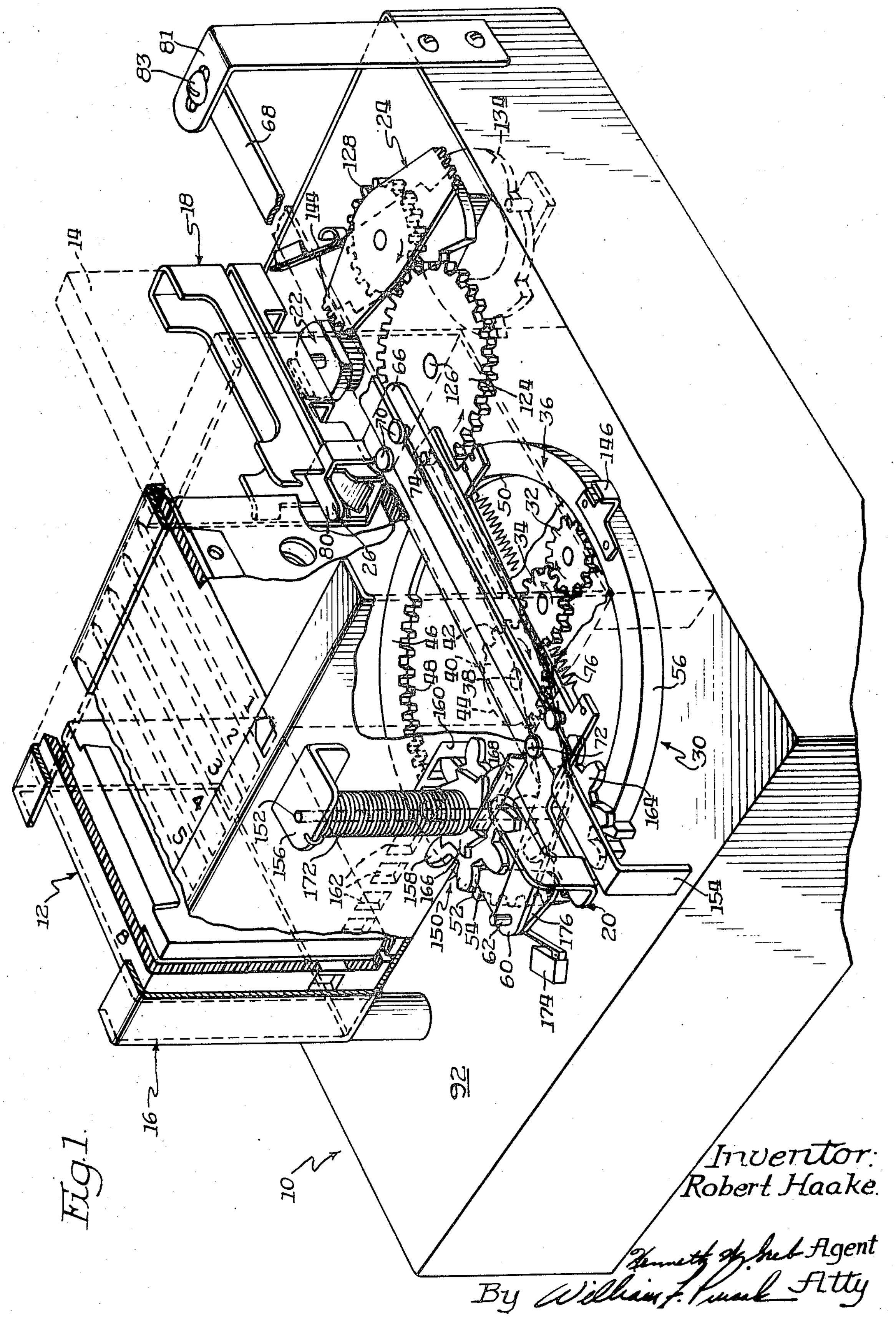
FIG. 1 is a left rear perspective view of the present invention showing the mechanism in an initial position.

The basic operation of the present tape recorder-reproducer 10 will be summarized. A magazine 12 storing several tape cassettes 14 is slidably supported in a U-shaped guide member 16 for selectively positioning any one of the cassettes in alignment with a carrier means 18. A loading means 20 is operable to move a cassette 14 from the magazine 12 and place it in the carrier means 18. The cassette 14 is thereby in a first orientation for prepositioning a first magnetic track on a tape having a first and a second magnetic track. A support means 22 coupled to the carrier means 18 is operable to move the carrier means for placing the cassette 14 in an effective position for recording on or reproducing from the first magnetic track. The support means 22 is then operable to move the carrier means from the effective position to the cassette receiving position.

An inverting means 24 is operable to rotate the carrier means 18 180° which places the cassette 14 in a second orientation for prepositioning the second magnetic track. The support means 22 is again operable to place the cassette 14 in the effective position for recording on or reproducing from the second magnetic track. The support means 22 is again operable to move the carrier means 18 from the effective position to the cassette receiving position. The inverting means 24 operates to rotate the carrier means 18 180° which returns the cassette 14 back to the first orientation. An unloading means 26 is operable to move the cassette 14 from the carrier means 18 and place it in the magazine 12. The cassette 14 is thereby returned to the magazine 12 in the same orientation as it was removed therefrom.

Figures 2, 5:
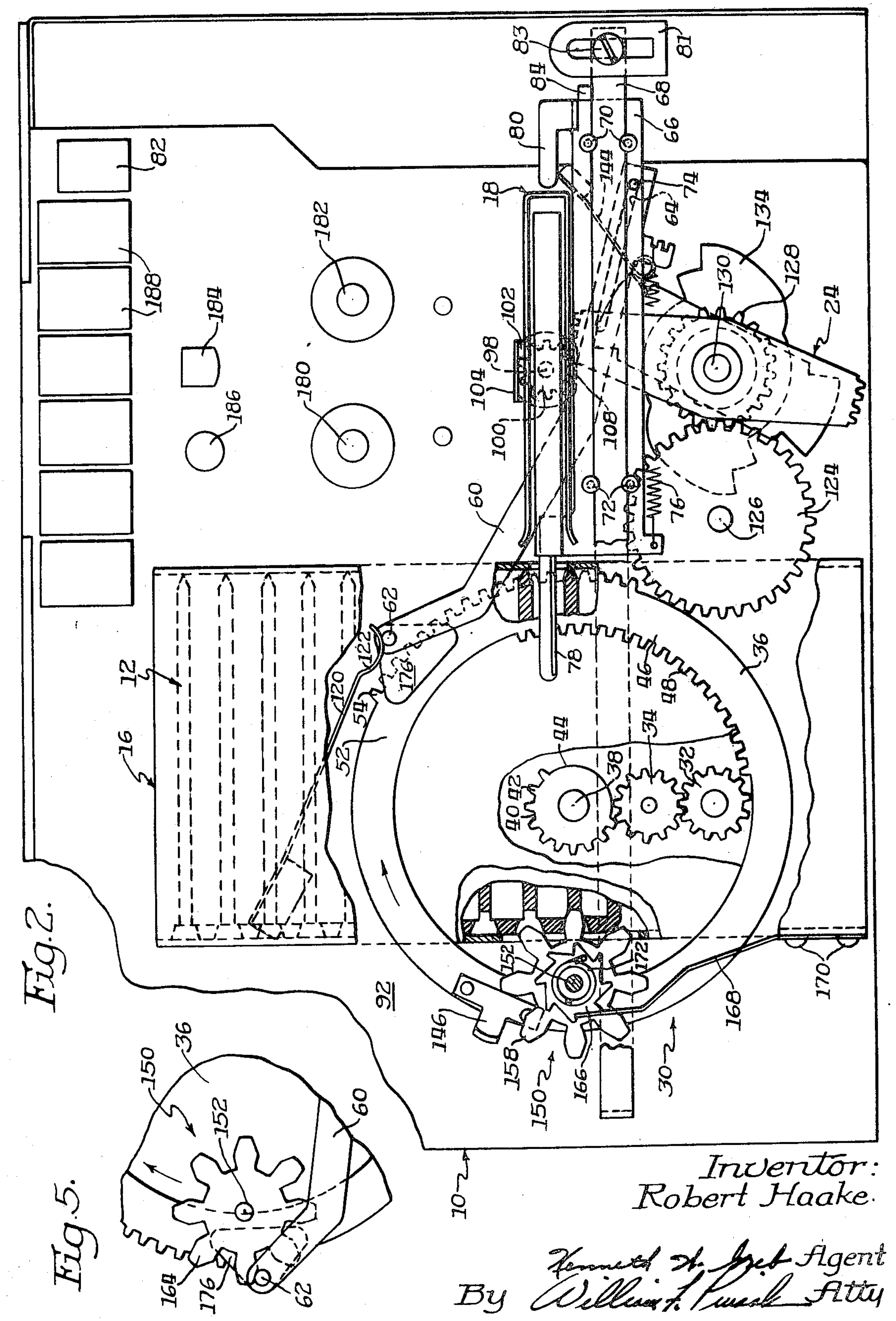
FIG. 2 is a plan view of FIG. 1 showing the mechanism in position having placed a cassette in a carrier means and showing a magazine indexing means.
FIG. 5 is a portion of FIG. 2 showing the actuation of the indexing means.

Referring to FIGS. 1 and 2, a power drive means 30 operable to perform all of the above described functions will now be described. A gear 32 is rotated clockwise at a constant speed by a motor (not shown). An idler gear 34 is constantly in mesh with gear 32 and is rotated counter-clockwise thereby. A gear member 36 is rotatably supported on a shaft 38. The gear member 36 has an integral first sector gear 40 with a toothed section 42 of approximately 270° concentric about the shaft 38 and with an ineffective section 44. The toothed section 42 is of a diameter to mesh with idler gear 34. The gear member 36 has an integral second sector gear 46 with a toothed section 48 of approximately 70° concentric about the shaft 38 and with an ineffective section 50. The toothed section 48 is of a diameter to mesh with the motor driven gear 32. The gear member 36 has an integral third sector gear 52 with a toothed section 54 of approximately 70° concentric about the shaft 38 and with an ineffective section 56.

The loading means 20 includes an arm 60 pivotally connected at one end to the gear member 36 by a pin 62. The arm 60 has an elongated slot 64 at the opposite end thereof. A slide member 66 is slidably supported on a rail 68 by two pair of guide pins 70 and 72. A pin 74 is rigidly assembled to the slide member 66 and extends through the slot 64 in the arm 60. A spring 76 is connected at one end to the slide member 66 and at the other end to the arm 60. The spring 76 has a sufficient tension to act as a link between the arm 60 and the slide member 66 during the loading operation. The slide member 66 has an upstanding finger 78 at the left end thereof and has an upstanding finger 80 at the right end thereof. The rail 68 is adjustably supported at the right end to a bracket 81 by a screw 83. The rail 68 can adjustably align the unloading means 80 with a cassette 14 in the carrier means 18.

The loading means 20 is operable to move a cassette 14 from the magazine 12 and place it into the carrier means 18. The gear 32 is rotated clockwise when a motor connected thereto is energized such as by depressing the Reject button 82. The gear 32 rotates idler gear 34 counter-clockwise. The idler gear 34 normally engages the first gear sector 40 substantially midway of the toothed section 42. The idler gear 34 rotates the first gear sector 40 clockwise, which, in turn, rotated gear member 36 clockwise at a predetermined one speed. The pin 62 carried by the gear member 36 drives the arm 60 toward the right. The spring 76, acting as a link, drives the slide member 66 toward the right causing the finger 78 to engage the cassette 14 and move it into the carrier means 18. The position of the loading means 20 after the cassette 14 is placed in the carrier means 18 is shown in FIG. 2. The slide member 66 is limited against a stop 84 which is rigidly assembled to the machine. The toothed section 42 is rotated out of mesh from idler gear 34 and the toothed section 48 has its end tooth adjacent the teeth of gear 32.

Figures 3, 4:
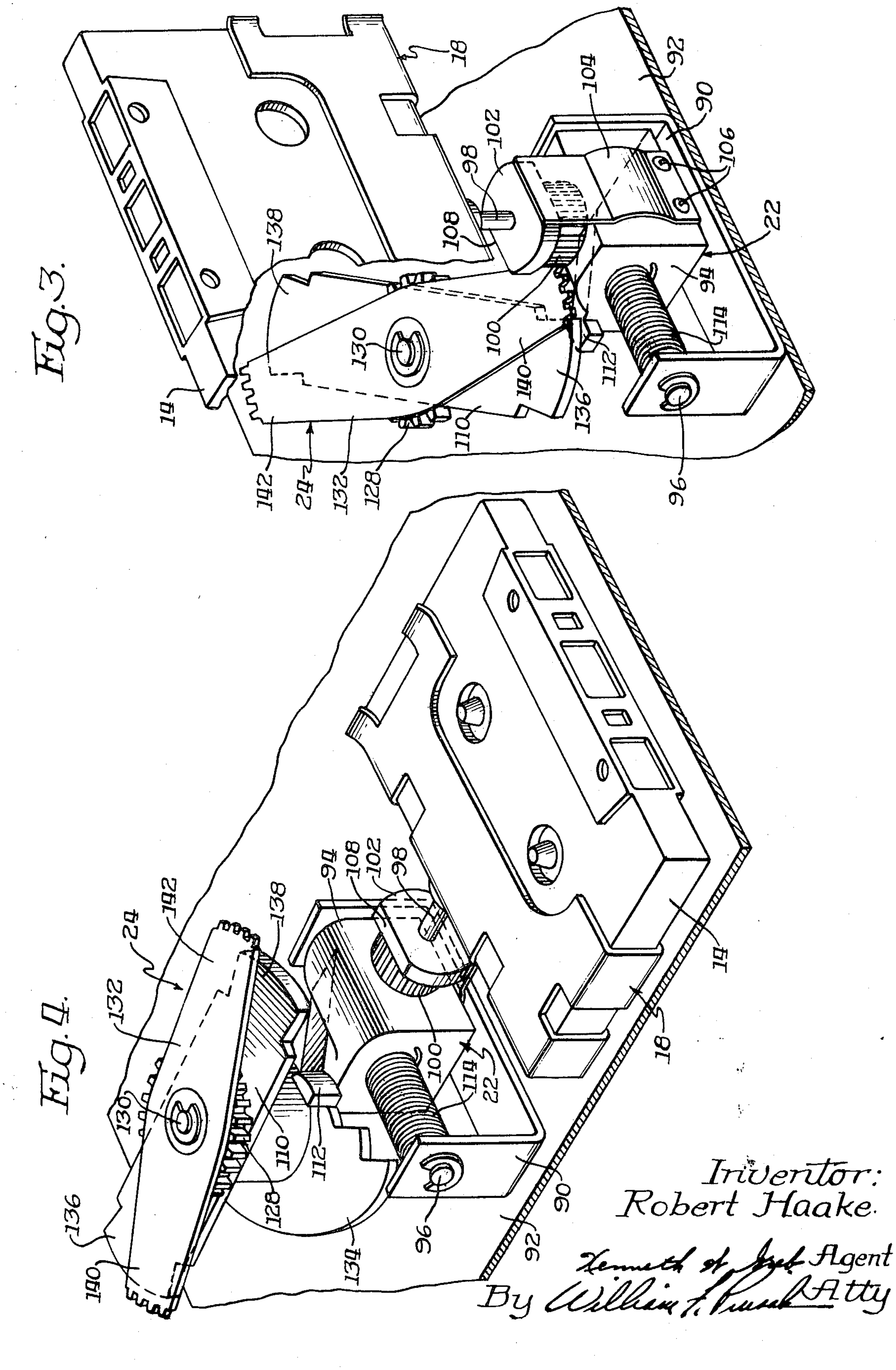
FIG. 3 is a left front perspective view showing the carrier means in a cassette receiving position.
FIG. 4 is a view similar to FIG. 3 showing the carrier means placing a cassette in an effective position.

Referring to FIGS. 3 and 4, the supporting means 22 coupled to the carrier means 18 includes a U-shaped bracket 90 rigidly assembled to a machine frame 92. A base 94 is pivotally supported on a shaft 96, which, in turn, is supported in the bracket 90. A post 98 has its upper end rigidly assembled to the carrier means 18 by any suitable means and has its lower end pivotally extending into the base 94. A gear 100 and a detent member 102 are rigidly assembled to the post 98. A flat spring 104 is rigidly assembled to the base 94 by screws 106 and is biased against a flat surface 108 on the detent member 102. The combination of the detent member 102 and flate spring 104 holds the carrier means 18 relative to the base 94 for holding the cassette 14 in the first orientation. The carrier means 18 is held in the vertical position of FIG. 3 by a cam driver 110 engaging a cam surface 112 integrally formed from the base 94. A torsion spring 114 has one end connected to the bracket 90 and the other end connected to the base 94. The spring 114 is tensioned to bias the base 94 clockwise about shaft 96, which biases the carrier means 18 toward the cassette effective position.

The support means 22 is operable to move the carrier means 18 from the vertical cassette receiving position as shown in FIG. 3 to the horizontal cassette effective position as shown in FIG. 4. Referring back to FIG. 2, a leaf spring 120 is rigidly assembled on the frame 92. The spring 120 has a free end 122 engaging the pin 62 under tension to angularly advance the gear member 36 clockwise about the shaft 38 until the first tooth of the toothed section 48 engages the gear 32. With the aid of the spring 120, the gear member 36 continuously rotated clockwise first by the toothed section 42, then by the spring 120 and thereafter by the toothed section 48. The gear member 36 rotates at a reduced speed when the toothed section 48 is driven by gear 32 relative to the predetermined speed when the toothed section 42 is driven by gear 32. The reduced speed is approximately one-fourth the predetermined one speed which provides the desirable torque and angular rotation speed for the cassette inverting operation.

When the gear 32 engages the toothed section 48, the gear member 36 advances the toothed section 54 to engage and rotate an idler gear 124 counter-clockwise about a supporting shaft 126. The idler gear 124 is constantly in mesh with a gear 128 which is pivotally supported on a shaft 130. As best shown in FIG. 4, the cam driver 110 is rigidly assembled to the underside of the gear 128 for rotation about the axis of the shaft 130. A toothed plate 132 is rigidly assembled to the upper side of the gear 128 for rotation about the axis of the shaft 130. When the gear 128 is rotated, the cam driver 110 rotates clockwise about the shaft 130 from the position shown in FIG. 3, which moves off from cam surface 112 of the base 94. The spring 114 now pivots the base 94 clockwise about the shaft 96 to place the carrier means 18 and the cassette 14 in the effective position, as shown in FIG. 4, for playing or recording one of the magnetic tracks. A cam 134 is also assembled to rotate with the gear 128, which is rotated a sufficient amount to actuate a switch (not shown) by de-energizing the motor driving the gear 32. The entire gear drive train is now stopped to permit the playing or recording operation.

At the end of tape movement, an electric circuit (not shown) energized the motor for again rotating the gear 32 clockwise. The cam driver 110 having oppositely disposed cam ends 136 and 138 is rotated by the gear 128 to cause cam end 138 to engage the cam surface 112 for advance along the incline causes the base 94 to be pivoted counter-clockwise about the shaft 96. The carrier means 18 is returned to the vertical cassette receiving position. Continual rotation of the gear 128 rotates the toothed plate 132, which has oppositely disposed toothed ends 140 and 142, clockwise about the shaft 130. The toothed end 142 engages and rotates the gear 100 clockwise about the post 98. The post 98 has an axis substantially perpendicular to a longitudinal edge of the cassette 14 along which a linear length of tape extends. The carrier means 18 is rotated 180° which inverts the cassette 14 to the second orientation. The gear 32 continues to rotate causing the toothed end 142 to advance out of mesh from the gear 100 and causes the cam end 138 to advance off cam surface 112. The spring 114 pivots the base 94 to place the cassette 14 in the effective position for playing or recording the second of the magnetic tracks. The cam 134 is pivoted to again actuate the switch (not shown) for de-energizing the motor driving gear 32. The entire gear drive train is again stopped to permit the playing or recording operation.

At the end of tape movement, the electric circuit reenergizes the motor for rotating the gear 32. The toothed sector 54 still remains in mesh with the idler gear 124 which continues to rotate gear 128 at the reduced rate relative to the gear member 36 being rotated by the toothed sector 42. Cam end 136 engages the cam surface 112 and advances along the incline to pivot the base 94 for returning the carrier means 18 to the vertical cassette receiving position. Toothed end 140 engages the gear 100 and rotates the carrier means 180° which inverts the cassette back to the first orientation. Cam end 136 and toothed end 140 are stopped in the position as shown in FIG. 3 by the trailing end of the toothed sector 54 advancing out of mesh from the idler gear 124. A spring 144 (FIG. 2) is rigidly mounted on the frame 92. The spring 144 is positioned to engage the cam driver 110 for biasing the cam driver 110, the cam 134, the gear 128, and the toothed plate 132 counter-clockwise about the shaft 130 to a limited position determined by the toothed end 140 rests against a tooth of the gear 100. This predetermined orientation assures the proper angular position of the cam 134, drive cam 110 and toothed plate 132 each time the toothed section 54 engages and rotates the idler gear 124.

During the rotation of the gear member by substantially one-half of the toothed section 48, the arm 60 is moved toward the right. Being the slide member 66 is positioned against the stop 84, the arm 60 moves relative to the pin 74 along the slot 64 which stretches the spring 76. During the rotation of the gear member by the remaining half of the toothed section 48, the arm 60 is moved toward the left until the end of the slot 64 contacts the pin 74.

The gear member 38 has been rotated by the gear 32 engaging the toothed section 48 to position an abutment 146 rigidly assembled to the gear member 36 under the free end 122 of the spring 120. The position of the abutment 146 is similar to that of the pin 62 of FIG. 2. With the gear member 36 in this position, the trailing end of the toothed section 48 is out of mesh from the gear 32 and the leading end of the toothed section 42 is adjacent to but not in mesh with the idler gear 34. This uncoupling of the gear member 36 from the gear 32 permits changing the rate of rotation of the gear member 36 by the gear 32.

The unloading means 80 is operable to move a cassette 14 from the carrier means 18 and place it into the magazine 12. The tension of the spring 120 against the abutment 146 advances the gear member 36 clockwise sufficiently to engage the leading end of the toothed section 42 with the idler gear 34. The gear member 36 is again rotated clockwise at the same rate it was rotated for the cassette loading operation. The arm 60 is pulled to the left by the gear member 36 which moves the slide member 66 to the left by way of the pin 74. The finger 80 of the slide member 66 engages and moves the cassette 14 from the carrier means 18 and places the cassette 14 back in the same position in the magazine 12 and in the same orientation it was before it was removed therefrom.

Referring to FIGS. 1, 2 and 5, an indexing means 150 is operable to advance the magazine 12 one step to position a succeeding cassette in alignment with the carrier means 18. A vertical shaft 152 is pivotally supported between a lower bracket 154 and an upper bracket 156. A first toothed wheel 158 is rigidly assembled to the shaft 152. The teeth of the wheel 158 extend through an opening 160 in the guide member 16 and engage a series of openings 162 in the magazine 12. A second toothed wheel 164 is rigidly assembled to the shaft 152 and positioned adjacent the gear member 36. A ratchet member 166 is rigidly assembled to the shaft 152 and positioned adjacent the toothed wheel 158. A lead spring 168 is rigidly assembled to the guide member 16 by screws 170. A free end of the spring 168 engages the ratchet member 166 to prevent the ratchet member 166 and the associated toothed wheels 158 and 164 from rotating counter-clockwise about the shaft 152.

After the gear member 36 has rotated the amount necessary to complete the unloading operation, the gear member 36 continues to rotate to cause the pin 62 to engage a tooth of the toothed wheel 164 and rotate the toothed wheel 164 clockwise about the axis of the shaft 152. The rotation of the toothed wheel 164 rotates the toothed wheel 158, which, in turn, advances the magazine 12 in a distance sufficient to align a succeeding cassette 14 with the carrier means 18. A torsion spring 172 surrounds the shaft 152 and has one end connected to the upper bracket 156 and has the opposite end connected to the ratchet member 166. The spring 172 biases the ratchet member 166 counter-clockwise against the leaf spring 168 thereby holding the magazine 12 in any of its selected positions. As the gear member 36 advances the pin 62 past the toothed wheel 164, a switch 174 is actuated by a pin support 176 to de-energize the motor thereby stopping the rotation of the gear 32.

The tape recorder-reproducer mechanism has returned to its initial condition with the gear relationship as shown in FIG. 1. Pressing the Reject button 82 would cause a repeat of the entire cycle. The machine is equipped with a switch and corresponding circuitry (not shown) that would make the switch 174 ineffective thereby permitting automatic continuous cycling of the gear member 36 for playing or recording several cassettes automatically.

Referring back to FIG. 2, the play or record station is shown to include drive spindles 180 and 182 for driving and rewinding the tape. A transducer head 184 is for recording on or reproducing from the tape. A drive capstan 186 is shown for cooperation with a pressure roller (not shown) for pulling the tape past the head 184. A row of buttons 188 are conventional tape controls for a tape recorder-reproducer.

What is claimed is:

1. A tape recorder-reproducer having a record-play station for recording on and reproducing from a tape in a cassette, the tape having a first magnetic track and a second magnetic track, the second magnetic track being recorded in a direction opposite from the first magnetic track, the cassette having a longitudinal edge along which a linear length of tape extends and along which tape is accessible for recording and reproducing, the improvement comprising:

means for storing at least one cassette;

carrier means having a first plane for receiving said one cassette from said storing means;

support means coupled to said carrier means for pivotable movement about a first axis substantially parallel to said longitudinal edge of the cassette for moving said carrier means carrying said one cassette to a second plane substantially perpendicular to said first plane for placing the first magnetic track at the record-play station and for returning said carrier means to said first plane;

actuating means for pivoting said support means about said first axis for moving said carrier means to and from said first and second planes;

inverting means for pivoting said carrier means while in said first plane about an axis substantially perpendicular to said first axis for inverting said one cassette for return to said second plane for placing the second magnetic track at the record-play station;

loading means for moving said one cassette from said storing means into said carrier means while in said first plane; and unloading means for moving said one cassette from said carrier means while in said first plane into said storing means.

2. A tape recorder-reproducer as defined in claim 1 further comprising drive means adapted for actuating said loading means at one speed and for actuating said carrier means to invert said one cassette at a reduced speed relative to said one speed.

3. A tape recorder-reproducer as defined in claim 2, wherein said drive means includes a gear member rotatable from a constant speed power source and adapted for operating said loading means at said one speed and for operating said carrier means to invert said one cassette at said reduced speed.

4. A tape recorder-reproducer as defined in claim 3 wherein said gear member includes a first gear sector operable by said power source to provide said one speed for operating said loading means and includes a second gear sector operable by said power source to provide said reduced speed for inverting said carrier means.

5. A tape recorder-reproducer as defined in claim 4 further comprising spring means for moving said gear member to engage said second gear sector with said power source when changing from said one speed to said reduced speed.

6. A tape recorder-reproducer as defined in claim 1 further comprising drive means adapted for operating said loading means and said unloading means at one speed and for operating said inverting means to invert said one cassette at a reduced speed relative to said one speed.

7. A tape recorder-reproducer as defined in claim 6 wherein said drive means includes a gear member rotatable from a constant speed power source and adapted for operating said loading means and said unloading means at said one speed and for operating said inverting means to invert said one cassette at said reduced speed relative to said one speed.

8. A tape recorder-reproducer a defined in claim 7 wherein said gear member includes a first gear sector operable by said power source to provide said one speed for operating said loading means and said unloading means and includes a second gear sector operable by said power source to provide said reduced speed for inverting said carrier means.

9. A tape recorder-reproducer as defined in claim 1 wherein said loading means includes a slide member operable to engage and move said one cassette from said storing means into said carrier means, and said unloading means includes said slide member operable to engage and move said one cassette from said carrier means into said storing means.

10. A tape recorder-reproducer as defined in claim 1, wherein said loading means includes a power driven member adapted for actuating said loading means and said unloading means.

11. A tape recorder-reproducer as defined in claim 1 further comprising indexing means for moving said storing means to position any one of the plurality of cassettes in alignment with said carrier means while in said first plane, and said unloading means includes means for actuating said indexing means to effect movement of said storing means after the completion of said unloading means operation.

12. A tape recorder-reproducer as defined in claim 11 wherein said indexing means includes an indexing member operable to move said storing means, and said unloading actuating means includes a member for actuating said indexing member thereby automatically moving said storing means for aligning another one of the plurality of cassettes with said carrier means while in said first plane.

13. A tape recorder-reproducer as defined in claim 1 wherein said storing means includes a magazine for supporting a plurality of cassettes in a side-by-side relationship arrangement with each cassette in a plane parallel to said one cassette in said carrier means while in said first plane, and indexing means for moving said magazine to position any one of the plurality of cassettes in alignment with said carrier means while in said first plane.

14. A tape recorder-reproducer as defined in claim 1 further comprising detent means for holding said carrier means in said first plane.

15. A tape recorder-reproducer as defined in claim 1 wherein said support means includes a cam surface and said actuating means includes a cam driver acting on said cam surface for moving said carrier means in a first direction from one to the other of said first and second planes.

16. A tape recorder-reproducer as defined in claim 15 wherein said actuating means includes a spring connected to said support means for moving said carrier means in a second direction from one to the other of said first and second planes.

17. A tape recorder-reproducer or the like having a record-play station for individually receiving a tape cassette carrying a tape having a first and a second magnetic track, the second magnetic track being recorded in a direction opposite from the first magnetic track, the cassette having a longitudinal edge along which a linear length of tape extends and along which said tape is accessible for recording and reproducing, the improvement comprising:

means for storing at least one cassette;

carrier means having a plane for receiving the cassette from said storing means in a first orientation and operable for inverting the cassette about an axis in said receiving plane and perpendicular to said longitudinal edge of the tape cassette for positioning the cassette in a second orientation in said receiving plane;

carrier support means operable to move said carrier means to and from the record-play station relative to said receiving plane; and drive means operable to move the cassette from said storing means to said carrier means, to move said carrier means from said receiving plane to the record-play station while the cassette is in said first orientation to place the first magnetic track at the record-play station, to move said carrier means from the record-play station to said receiving plane,
to invert said carrier means about said axis to position the cassette in said second orientation,
to move said carrier means from said receiving plane to the record-play station while the cassette is in said second orientation to place the second magnetic track at the record-play station, to move said carrier means from the record-play station to said receiving plane,
to invert said carrier means to position the cassette in said first orientation, and
to move the cassette from said carrier means to said storing means.

* * * * *